US012708935B2

(12) United States Patent
Kelly

(10) Patent No.: US 12,708,935 B2
(45) Date of Patent: Aug. 18, 2026

(54) APPARATUS AND METHOD FOR DENATURING ASBESTOS

(71) Applicant: THERMACHANGE LTD, Liverpool (GB)

(72) Inventor: Eugene Michael Kelly, Liverpool (GB)

(73) Assignee: THERMACHANGE LTD, Liverpool (GB)

( * ) Notice: Subject to any disclaimer, the term of this patent is extended or adjusted under 35 U.S.C. 154(b) by 1166 days.

(21) Appl. No.: 17/769,688

(22) PCT Filed: Jun. 2, 2020

(86) PCT No.: PCT/GB2020/051326
§ 371 (c)(1),
(2) Date: Apr. 15, 2022

(87) PCT Pub. No.: WO2020/245571
PCT Pub. Date: Dec. 10, 2020

(65) Prior Publication Data

US 2022/0395875 A1 Dec. 15, 2022

(30) Foreign Application Priority Data

Jun. 5, 2019 (GB) ..................................... 1908027

(51) Int. Cl.
*B09B 3/40* (2022.01)
*A62D 3/40* (2007.01)
(Continued)

(52) U.S. Cl.
CPC .................. *B09B 3/40* (2022.01); *A62D 3/40* (2013.01); *F27B 9/062* (2013.01); *B09B 2101/35* (2022.01)

(58) Field of Classification Search
CPC ........ A62D 3/40; B09B 2101/35; B09B 3/40; F27B 9/02; F27B 9/062; F27D 11/02; F27D 17/10
(Continued)

(56) References Cited

U.S. PATENT DOCUMENTS 4,012,191 A * 3/1977 Lisankie ................... F02G 5/02 432/223
4,200,783 A * 4/1980 Ehret ...................... F24D 11/00 165/104.31
(Continued)

FOREIGN PATENT DOCUMENTS

| | | | |
|---|---|---|---|
| EP | 2990130 | A1 | 3/2016 |
| GB | 2332503 | A | 6/1999 |
| JP | 2007301425 | A | 11/2007 |

OTHER PUBLICATIONS

The International Search Report of the International Searching Authority for PCT Application No. PCT/GB2020/051326 mailed Sep. 15, 2020, 4 pages.
(Continued)

*Primary Examiner* — Sang Y Paik
(74) *Attorney, Agent, or Firm* — WOMBLE BOND DICKINSON (US) LLP

(57) ABSTRACT

An apparatus (10) comprising a heating chamber (12). The heating chamber (12) comprises electric heating means (14) for heating the interior (16) of the heating chamber (12) to denature asbestos or asbestos in asbestos comprising structures located in the interior (16) of the heating chamber (12). The apparatus (10) comprises a primary filter (18) downstream of the heating chamber (12). The apparatus (10) comprises an induced draft fan (20) downstream of the primary filter (18), wherein the apparatus (10) is configured such that in use the induced draft fan (20) draws emissions from the heating chamber (12) through the primary filter
(Continued)

(18). The apparatus (10) comprises a discharge stack (22) downstream of the primary filter (18). The discharge stack (22) comprises an outlet (24) for venting emissions to external atmosphere.

26 Claims, 9 Drawing Sheets

(51) Int. Cl.
*F27B 9/06* (2006.01)
*B09B 101/35* (2022.01)

(58) Field of Classification Search
USPC .......................................................... 219/385
See application file for complete search history.

(56) References Cited

U.S. PATENT DOCUMENTS 5,302,179 A * 4/1994 Wagner ..................... C05F 7/00 588/249
6,024,931 A * 2/2000 Hanulik .................. C22B 43/00 588/407
2008/0119684 A1* 5/2008 Mason ...................... B09B 3/25 588/320
2012/0015102 A1* 1/2012 Nowack ................. B65D 23/08 427/230
2015/0151153 A1 6/2015 Sakamoto

OTHER PUBLICATIONS

The Written Opinion of the International Searching Authority for PCT Application No. PCT/GB2020/051326 mailed Sep. 15, 2020, 5 pages.
The International Report on Patentability of the Patent Cooperation Treaty for PCT Application No. PCT/GB2020/051326 issued Dec. 7, 2021, 6 pages.
Office Action for EP counterpart Application No. 20730704.2, dated Feb. 26, 2026, 5 pages.
Witek, et al., Neutralization of cement-asbestos waste by melting in an arc-resistance furnace, Waste Management, 2017, pp. 336-345, vol. 69.

* cited by examiner

APPARATUS AND METHOD FOR DENATURING ASBESTOS

CROSS REFERENCE TO RELATED APPLICATIONS

This patent application is a US National Phase Application under 35 USC 371 of International Patent Application No. PCT/GB2020/051326, filed Jun. 2, 2020, which claims priority to Great Britain patent application no. 1908027.4 GB, filed Jun. 5, 2019.

TECHNOLOGICAL FIELD

Examples of the disclosure relate to an apparatus and method for denaturing asbestos, and in particular denaturing asbestos by heating the asbestos in a heating chamber.

BACKGROUND

Asbestos refers to a group of silicate minerals that share the same fibrous nature.

Asbestos has been extensively used in building materials for many years, for instance, asbestos may be mixed with cement to form structures such as roofing, pipes etc. As such structures deteriorate asbestos fibres are released into the atmosphere. It is known that prolonged inhalation of asbestos fibres can cause serious and fatal illnesses including lung cancer, mesothelioma, and asbestosis. Accordingly, structures comprising asbestos are being replaced with non-hazardous alternatives.

There is a requirement therefore to provide apparatus and methods for rendering asbestos and asbestos in asbestos comprising structures harmless.

BRIEF SUMMARY

According to various, but not necessarily all, examples of the disclosure there is provided an apparatus, the apparatus comprising:

- a heating chamber, the heating chamber comprising electric heating means for heating the interior of the heating chamber to denature asbestos or asbestos in asbestos comprising structures located in the interior of the heating chamber;
- a primary filter downstream of the heating chamber;
- an induced draft fan downstream of the primary filter, wherein the apparatus is configured such that in use the induced draft fan draws emissions from the heating chamber through the primary filter; and
- a discharge stack downstream of the primary filter, the discharge stack comprising an outlet for venting emissions to external atmosphere.

The heating chamber may be thermally insulated. The interior surface of the heating chamber may comprise a reflective coating. The heating chamber may comprise at least one sensor, wherein the at least one sensor is configured to monitor a measurable parameter relating to the internal environment of the heating chamber.

The heating chamber may comprise electric heating means on at least one interior surface, and may comprise electric heating means on each respective interior surface. The electric heating means may comprise electric heating elements.

The apparatus may comprise an afterburner downstream of the heating chamber and upstream of the primary filter, the afterburner being configured to heat emission from the heating chamber.

The apparatus may comprise a secondary filter downstream of the induced draft fan. The secondary filter may be a high-efficiency particulate absorber (HEPA) filter. The discharge stack may be downstream of the secondary filter.

The apparatus may comprise a heat recovery means downstream of the heating chamber. The heat recovery means may be downstream of the afterburner and upstream of the primary filter. The heat recovery means may be a heat recovery boiler.

The heating chamber may be configured to receive at least one carrier for locating asbestos and/or asbestos comprising structures in the interior of the heating chamber.

The apparatus may comprise a track, a part of the track underlying the heating chamber, wherein the at least one carrier is moveable along the track to be received in the heating chamber.

The apparatus may comprise a cooling station for locating denatured asbestos or denatured asbestos comprising structures, which may be a convection cooling chamber. The cooling station may be associated with the heat recovery means, or may be associated with a second heat recovery means.

The track may extend from the heating chamber to the cooling station, a part of the track underlying the cooling station, wherein the at least one carrier is moveable along the track to be received in the cooling station.

The primary filter may be a ceramic filter.

The at least one carrier may comprise a frame extending from a base, wherein asbestos and/or asbestos comprising structures are locatable on or in the frame.

An upper surface of the base of the at least one carrier may define at least part of the floor of the heating chamber when the at least one carrier is received in the heating chamber.

The heating chamber and the base of the at least one carrier may comprise corresponding mating parts, wherein the mating parts are engageable when the at least one carrier is received in the heating chamber.

The mating part of the heating chamber may extend at least along interior side portions of the heating chamber, and the mating part of the base of the at least one carrier may extend at least along the length of each side of the base.

The interior side portions extend inwardly from each respective side wall of the heating chamber. An upper surface of each respective interior side portion may define a part of the floor of the heating chamber, wherein the remainder of the floor is defined by the upper surface of the base of the at least one carrier when the at least one carrier is received in the heating chamber.

Possibly, the mating part of the heating chamber comprises a female part, and the mating part of the base of the at least one carrier comprises a male part.

Possibly, the female part comprises a groove, and the male part comprises a projection receivable in the groove. The mating parts may be slidingly engageable.

The base of the at least one carrier may comprise electric heating means for heating the interior of the heating chamber when the at least one carrier is received in the heating chamber. The electric heating means may be provided on the upper surface of the base. The electric heating means may comprise electric heating elements.

The upper surface of the base of the at least one carrier may comprise a reflective coating.

The heating chamber may be configured to receive a plurality of carriers for locating asbestos or asbestos comprising structures in the interior of the heating chamber. The base of each of the plurality of carriers may be engageable with adjacent carriers to provide an upper surface which defines at least part of the floor of the heating chamber when the plurality of carriers is received in the heating chamber.

Possibly, the apparatus is comprised in an enclosed space with the exception of a part of the discharge stack comprising the outlet for venting emissions to atmosphere, which part extends out of the enclosed space.

The enclosed space may be defined by the interior of a building, wherein a ventilation system is configured to maintain a negative pressure in the enclosed space. At least a part of the exterior of the building comprises solar panels, wherein in use the electric heating means for heating the interior of the heating chamber is powered by electricity generated by the solar panels.

According to various, but not necessarily all, examples of the disclosure there is provided a method, the method comprising:

- loading asbestos or asbestos comprising structures into a heating chamber comprising electric heating means;
- heating the interior of the heating chamber with the electric heating means;
- drawing emissions from the heating chamber through a primary filter using an induced draft fan;
- venting emissions to external atmosphere through an outlet of a discharge stack;
- removing thermally denatured asbestos and/or structures comprising thermally denatured asbestos from the heating chamber.

The interior of the heating chamber may be heated to a first temperature of about 100 to 200° C., and subsequently heated to a second temperature of about 800 to 1200° C. The second temperature may be about 1200° C. The interior of the heating chamber may be maintained at the second temperature for about 4 to 7 hours.

The asbestos may be comprised in a structure, wherein the structure comprises at least one other material. Example structures may comprise roofing and pipes. The asbestos may be comprised in a structure as a composite with at least one other material. The at least one other material may comprise cement.

The method may comprise milling the denatured product.

The apparatus may comprise any of the features described in any of the preceding statements or following description.

The methods may comprise any of the features described in any of the preceding statements or following description.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

Figure 1:
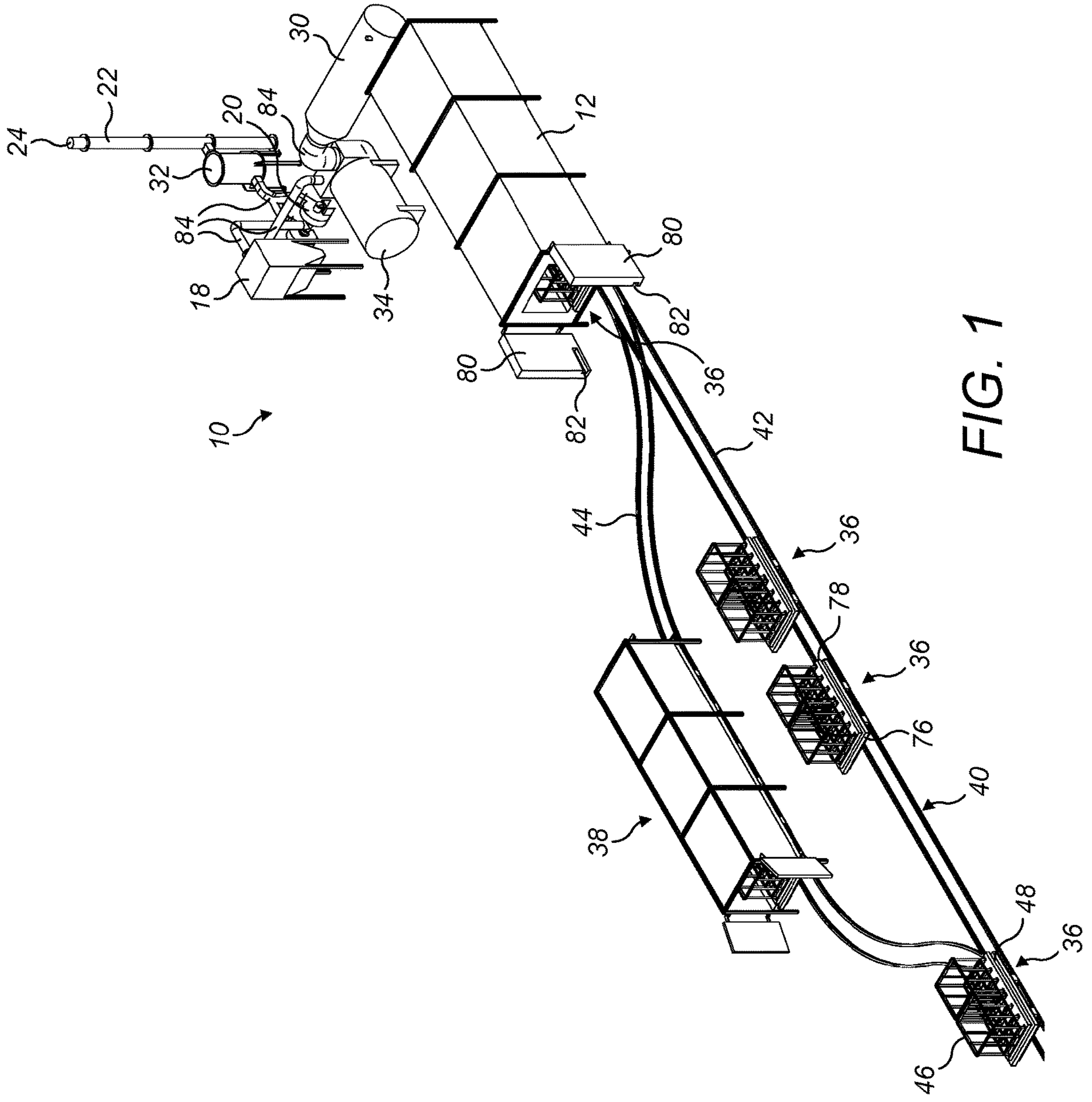
FIG. 1 illustrates an apparatus in perspective view.
Figure 2:
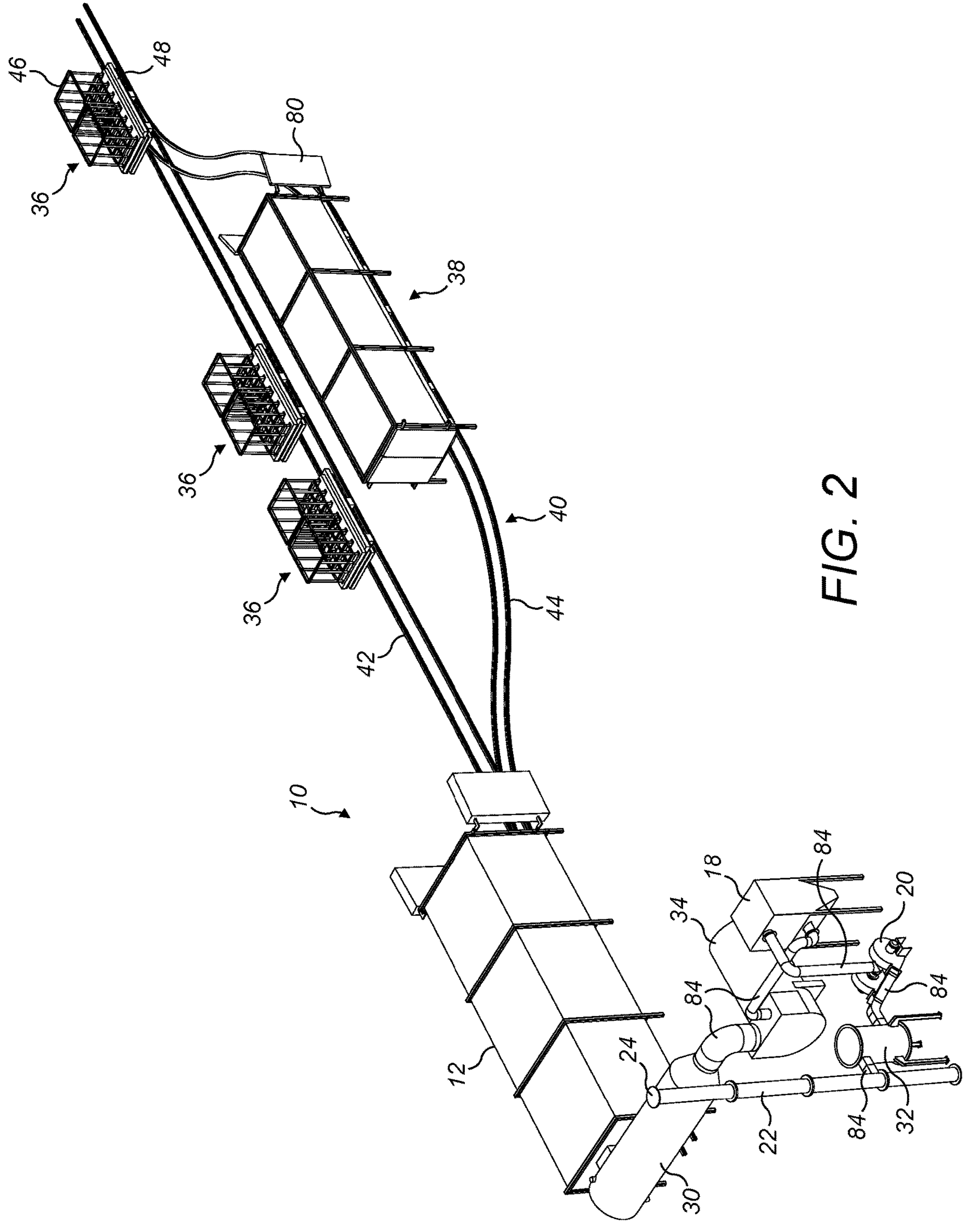
FIG. 2 illustrates the apparatus of FIG. 1 in perspective view from a different angle.
Figure 3:
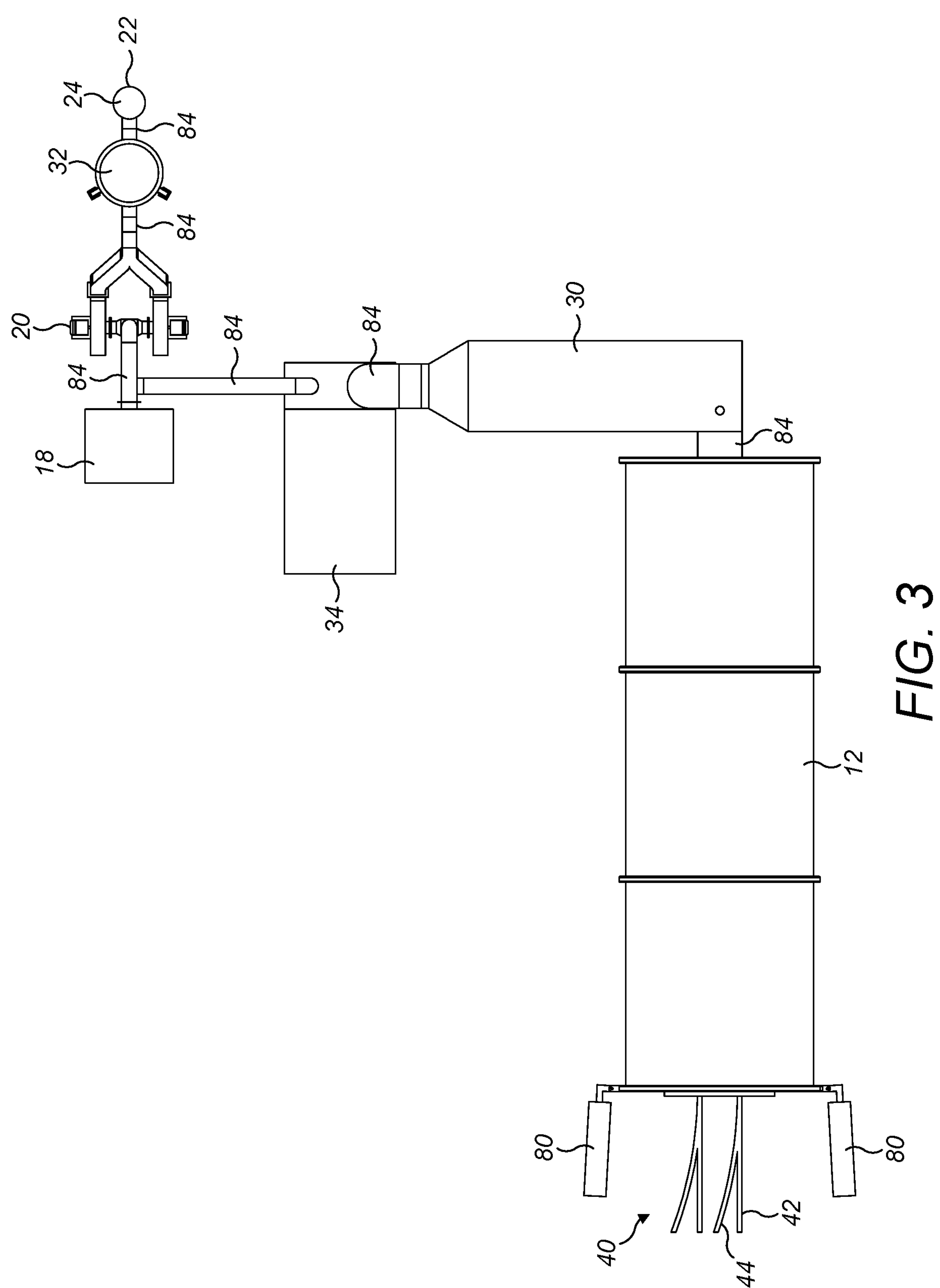
FIG. 3 illustrates the apparatus of FIG. 1 from above.
Figure 4:
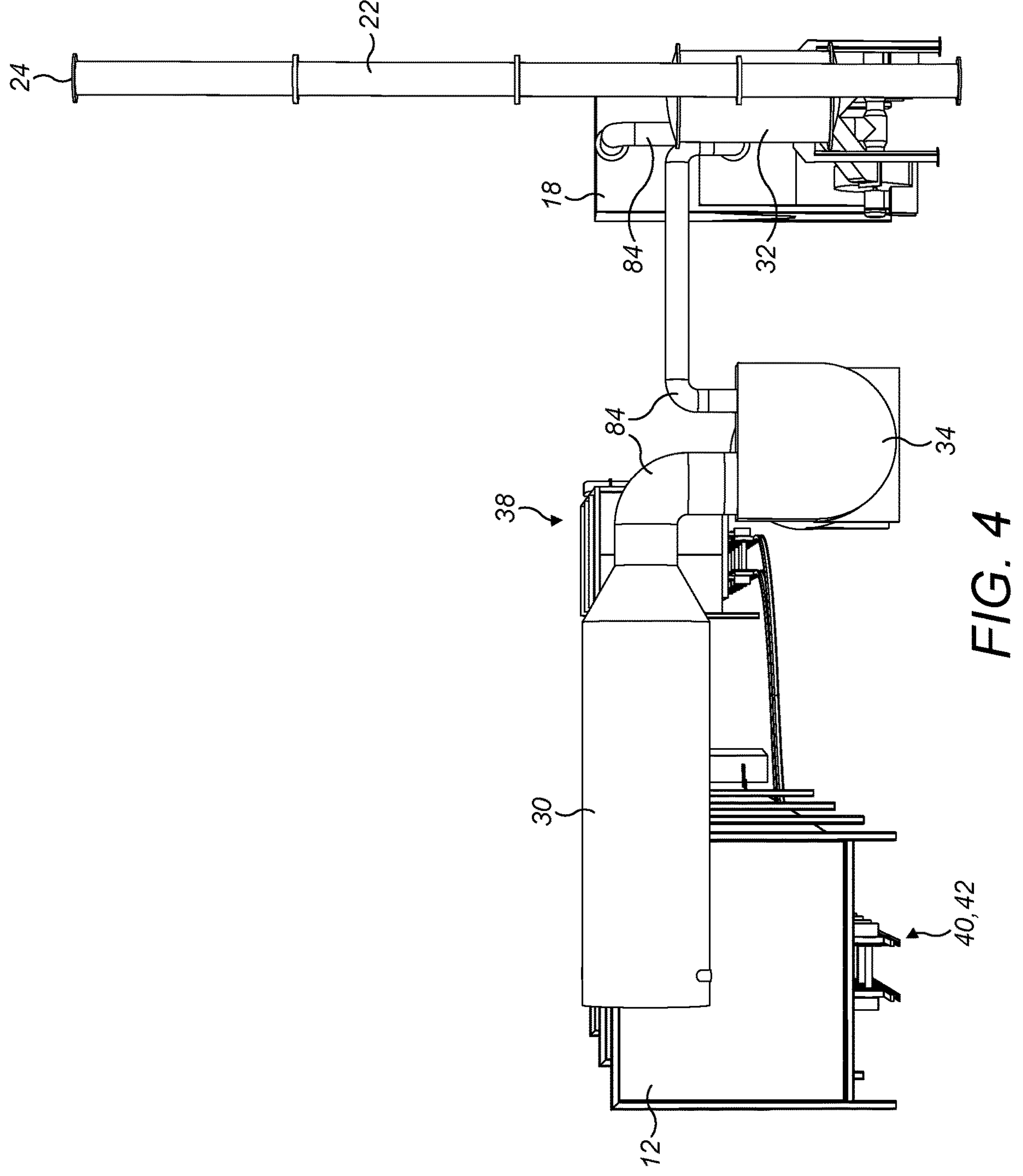
FIG. 4 illustrates the apparatus of FIG. 1 from one end.
Figure 5:
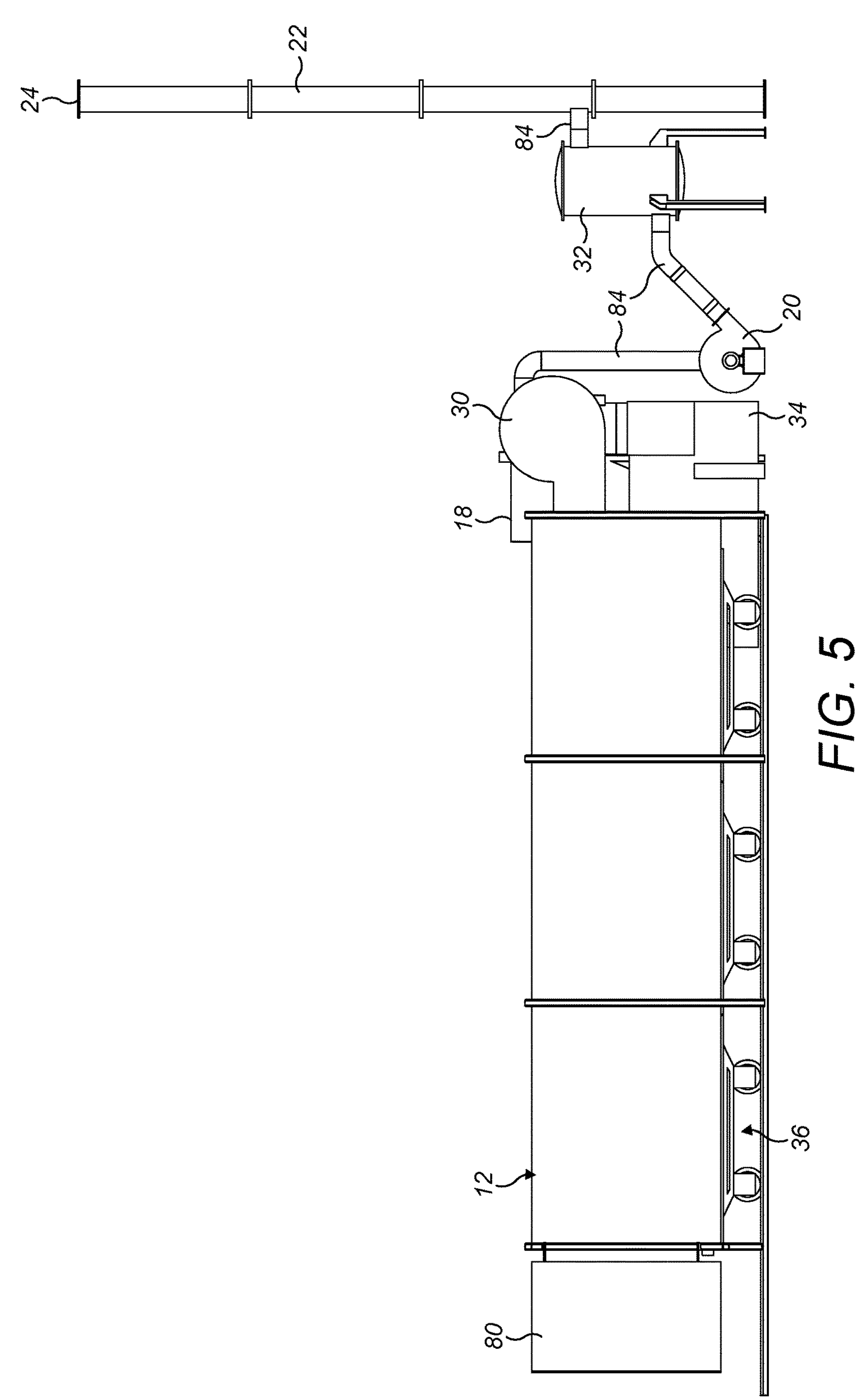
FIG. 5 illustrates the apparatus of FIG. 1 from one side.
Figure 6:
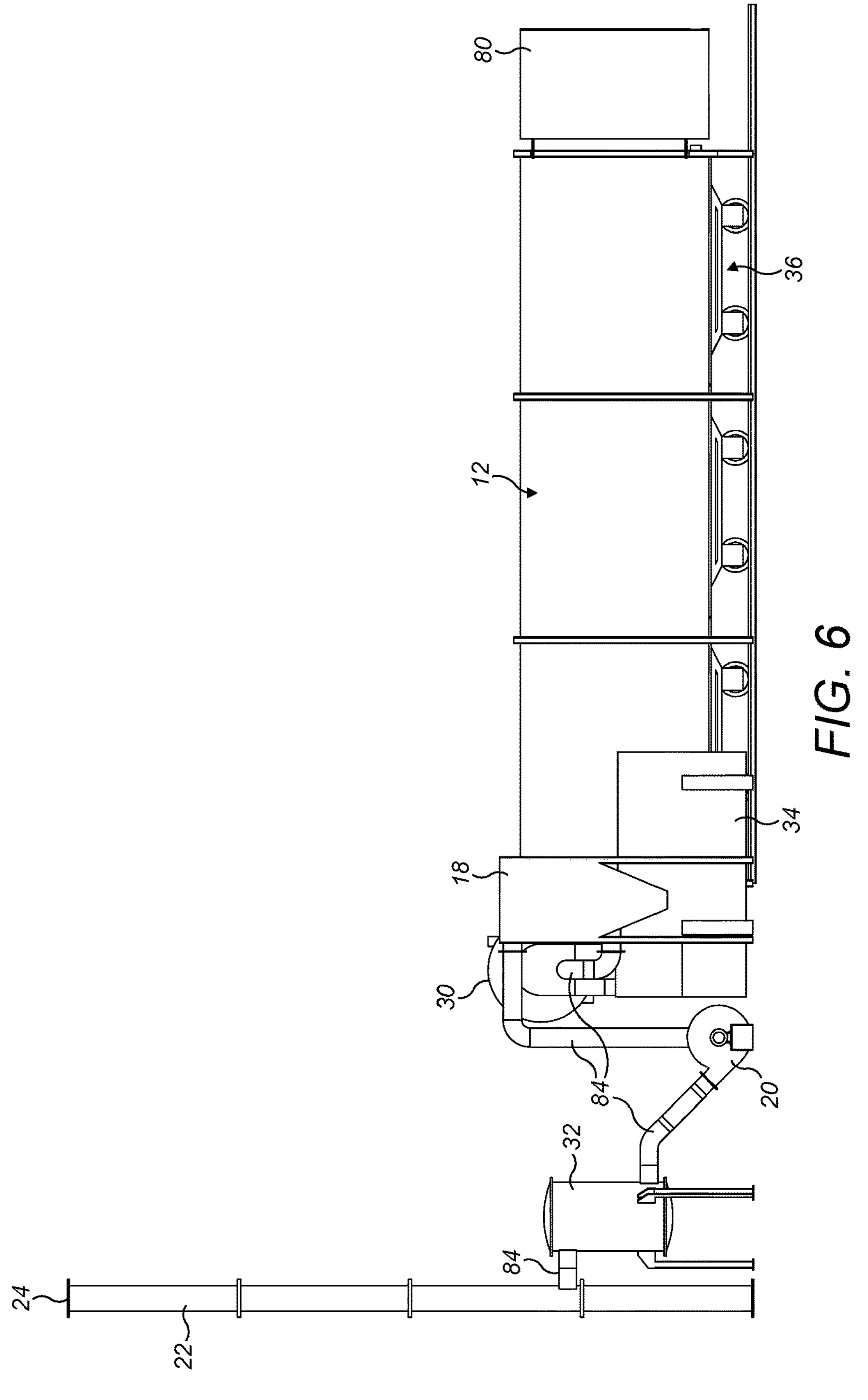
FIG. 6 illustrates the apparatus of FIG. 1 from the other side.

The figures illustrate an apparatus 10, and a method of thermally denaturing asbestos using the apparatus 10.

The apparatus 10 comprises a heating chamber 12. In examples of the disclosure, the heating chamber 12 may be referred to as a kiln. In the example illustrated, the heating chamber 12 is elongate, and may be referred to as a tunnel kiln. The heating chamber 12 may comprise a steel shell.

The heating chamber 12 comprises electric heating means 14 (see FIGS. 8 & 9) for heating the interior 16 of the heating chamber 12 to denature asbestos or to denature asbestos in asbestos comprising structures located in the interior 16 of the heating chamber 12. The electric heating means 14 may comprise electric heating elements 15. In some examples, the heating chamber 12 comprises electric heating elements 15 on at least one interior surface 28. In the illustrated example, the heating chamber 12 comprises electric heating elements 15 on each respective interior surface 28.

The electric heating elements 15 may be electric resistance heaters comprising of Kanthal "rod over bend" hairpin heavy gauge wire.

The apparatus 10 comprises a primary filter 18 downstream of the heating chamber 12, and an induced draft fan 20 downstream of the primary filter 18. The primary filter 18 may be a ceramic filter.

The apparatus 10 is configured such that in use the induced draft fan 20 draws emissions from the heating chamber 12 through the primary filter 18. In the illustrated example, in use the induced draft fan 20 induces a negative pressure in the interior 16 of the heating chamber 12 to draw emissions from the heating chamber 12 through the primary filter 18.

The apparatus comprises a discharge stack 22 downstream of the primary filter 18. The discharge stack 22 comprises an outlet 24 for venting emissions to external atmosphere.

In this specification the terms 'upstream' and 'downstream' are with respect to the flow of emissions from the heating chamber 12 (upstream) to external atmosphere (downstream) through the outlet 24 of the discharge stack 22.

The asbestos may be comprised in a structure, wherein the structure comprises at least one other material. Example structures comprise roofing and pipes. The at least one other material may comprise cement. The asbestos may be comprised in a structure as a composite with at least one other material, for example, a composite of asbestos and cement. Structures comprising asbestos may be provided in completely closed double plastic cover packs.

In examples of the disclosure, the heating chamber 12 is thermally insulated. Thermal insulation 26 is provided in each respective wall of the heating chamber 12 (see FIG. 8). The thermal insulation 26 may be low thermal mass insulation. The interior surface 28 of the heating chamber 12 may comprise a reflective coating.

In some examples, the heating chamber 12 comprises at least one sensor, wherein the at least one sensor is configured to monitor a measurable parameter relating to the internal environment of the heating chamber. The at least one sensor may be configured to measure the internal temperature of the heating chamber 12. The at least one sensor may be configured to measure the moisture content of the atmosphere in the heating chamber 12. The heating chamber 12 may comprise a plurality of sensors, wherein each of the plurality of sensors is configured to monitor a different measurable parameter relating to the internal environment of the heating chamber, for example, internal temperate or moisture content.

In the illustrated example, the apparatus comprises an afterburner 30 downstream of the heating chamber 12 and upstream of the primary filter 18. The afterburner is configured to heat emission from the heating chamber 12, for example, to a minimum temperature of 850° C., and minimum residence time of 2 seconds.

The afterburner 30 substantially converts any complex hydrocarbons in the emissions into carbon dioxide and water, and any NOx into nitrogen and water, for instance, which may be evolved from combustion of plastic wrapping around asbestos and/or structures comprising asbestos. The afterburner 30 may be a gas fired afterburner 20. The afterburner 30 may be about 30 kW.

In the illustrated example, the apparatus comprises a secondary filter 32 downstream of the induced draft fan 20. The secondary filter 32 may be a high-efficiency particulate absorber (HEPA) filter, and may be a medical grade HEPA filter. In examples comprising a secondary filter 32, the discharge stack 22 is downstream of the secondary filter 32.

In the illustrated example, the apparatus may comprise a heat recovery means 34 downstream of the heating chamber 12. In examples comprising an afterburner 30, the heat recovery means 34 is downstream of the afterburner 30 and upstream of the primary filter 18. In the illustrated example, the heat recovery means 34 is a heat recovery boiler. The heat recovery means 34 cools emissions to about 350° C. Accordingly, heated water may be provided from the heat recovery boiler, for example, to provide heating and/or to provide hot water for hot water taps or showers. Examples according to the present disclosure therefore have a positive environmental impact.

In the illustrated example, the heating chamber 12 is configured to receive at least one carrier 36 for locating asbestos or asbestos comprising structures in the interior 16 of the heating chamber 12.

In the illustrated example, the apparatus 10 comprises a track 40. The track 40 may be a narrow-gauge track. A part of the track underlies the heating chamber 12. The at least one carrier 36 is moveable along the track 40 to be received in the heating chamber 12.

The apparatus 10 may comprise a cooling station 38 for locating denatured asbestos or denatured asbestos comprising structures. The cooling station 38 may be associated with the heat recovery means 34 such that heat liberated from the cooling denatured material may be recovered. Alternatively, the cooling station 38 may be associated with a second heat recovery means (not illustrated).

The track 40 extends from the heating chamber 12 to the cooling station 38. A part of the track 40 underlies the cooling station 38. The at least one carrier 36 is moveable along the track 40 to be received in the cooling station 38. The track 40 comprises two lines 42, 44. A first line 42 extends from a storage/loading area (not illustrated) to the heating chamber 12. A second line 44 extends from the heating chamber 12 to the cooling station 38, and extends through the cooling station 38. The second line 44 connects to the first line 42 such that the at least one carrier 36 is moveable between the first and second lines 42, 44. Accordingly, in use a first batch of denatured material may be cooling in the cooling station 38 whilst a second batch of asbestos comprising material is being heat treated in the heating chamber 12. Accordingly, at least semi-continuous operation is possible.

The at least one carrier 36 comprises a frame 46 extending from a base 48. Asbestos or asbestos comprising structures are locatable on or in the frame 46. The at least one carrier 36 may be a trolley. The at least one carrier 36 comprises wheels or casters 52 engageable with the track 40. The base 48 may comprise thermal insulation.

In some examples, the frame 46 is of a composite construction, comprising of a metal grid floor supported by silicon carbide pedestals. A removable metal sheet may be provided to prevents debris falling through the frame 46 onto the base 48. In some examples, tie rods are provided through the columns and pedestals to enable the carrier 36 to be rotated on a fork truck for unloading of denatured material.

Figure 7:
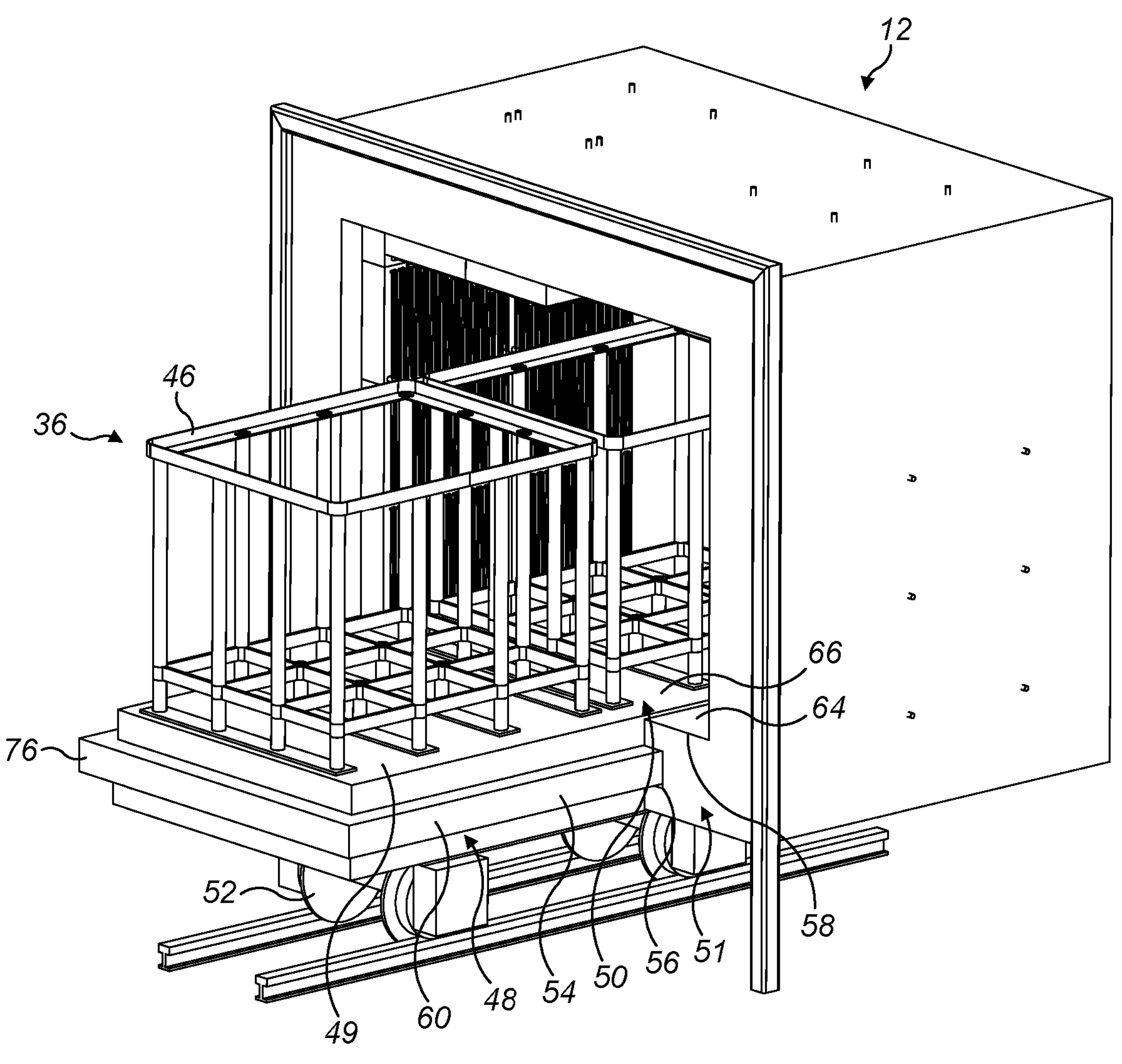
FIG. 7 illustrates a cutaway view of a heating chamber of the apparatus of FIG. 1 in perspective view revealing a carrier received therein.
Figure 8:
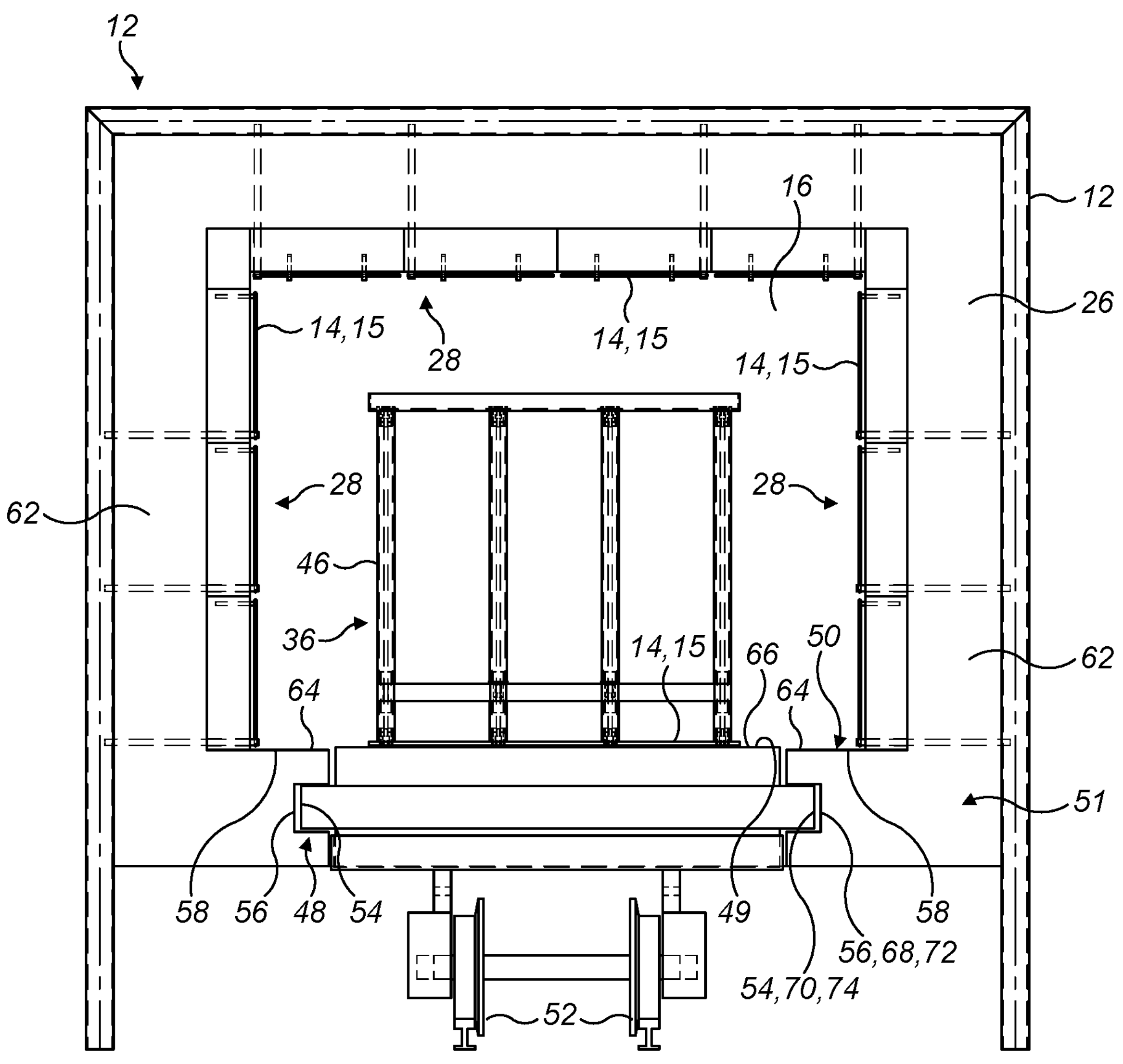
FIG. 8 illustrates a heating chamber of FIG. 7 in cross section.
Figure 9:
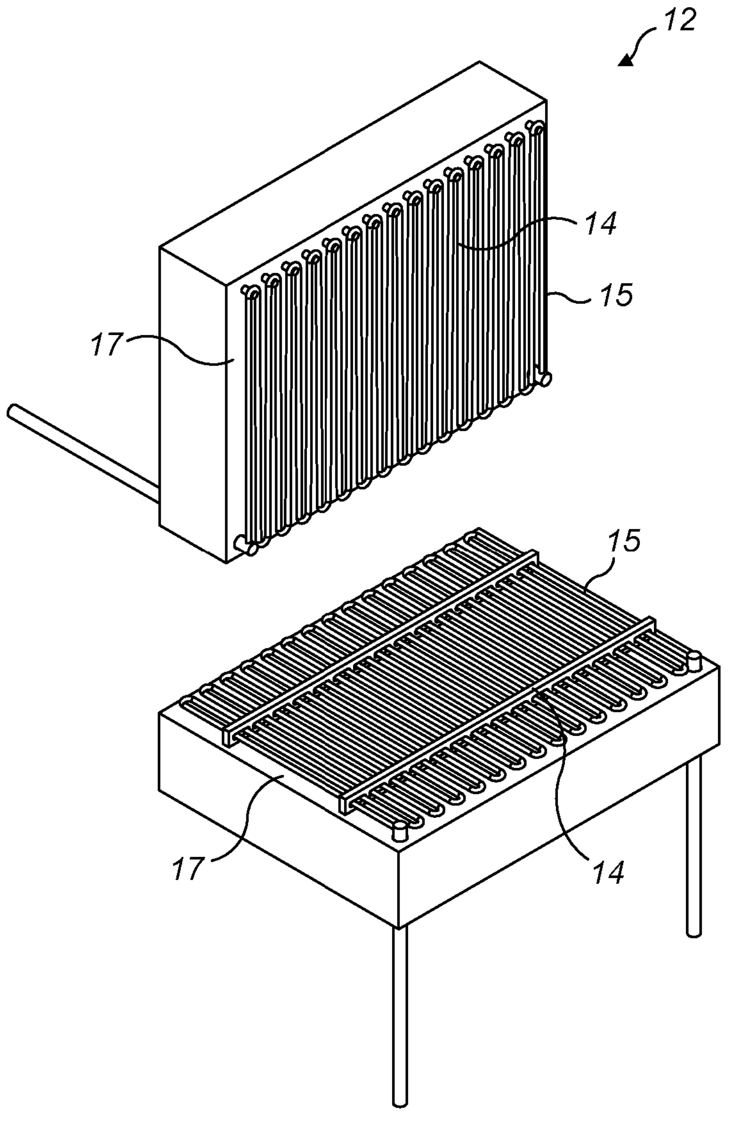
FIG. 9 illustrates a cutaway view of side walls of the heating chamber of FIG. 7.

As best illustrated in FIGS. 7 and 8, an upper surface 49 of the base 48 of the at least one carrier 36 defines at least part of the floor 50 of the heating chamber 12, when the at least one carrier 36 is received in the heating chamber 12. Accordingly, in a condition of the apparatus 10 when the at least one carrier 36 is received in the heating chamber 12, the base 51 of the heating chamber 12 comprises the base 48 of the at least one carrier 36.

In the illustrated example, the heating chamber 12 and the base 48 of the at least one carrier 36 comprise corresponding mating parts 54, 56, wherein the mating parts 54, 56 are engageable when the at least one carrier 36 is received in the heating chamber 12. The mating part 56 of the heating chamber 12 is aligned with the mating part 54 of the base 48 of the at least one carrier 36.

The mating part 56 of the heating chamber 12 extends at least along interior side portions 58 of the heating chamber 12. The mating part 54 of the base 46 of the at least one carrier 36 extends at least along the length of each side 60 of the base 46. The interior side portions 58 extend inwardly from each respective side wall 62 of the heating chamber 12. An upper surface 64 of each respective interior side portion 58 defines a part of the floor 50 of the heating chamber 12. The remainder 66 of the floor 50 is defined by the upper surface 49 of the base 46 of the at least one carrier 36 when the at least one carrier 36 is received in the heating chamber 12.

In the illustrated example, the mating part 56 of the heating chamber 12 comprises a female part 68, and the mating part 54 of the base 46 of the at least one carrier 36 comprises a male part 70. In the example illustrated, the female part 68 comprises a groove 72, and the male part 70 comprises a projection 74 receivable in the groove 72. The mating parts are slidingly engageable as the at least one carrier 36 is being received in the heating chamber 12. The mating parts 54, 56 may interlock.

The base 46 of the at least one carrier 36 comprises electric heating means 14 for heating the interior 16 of the heating chamber 12 when the at least one carrier 36 is received in the heating chamber 12. The electric heating means 14 is provided on the upper surface 49 of the base 46. In the illustrated example, the electric heating means 14 comprises electric heating elements 15. Accordingly, when the at least one carrier 36 is received in the heating chamber 12, electric heating means 14 are provide at least on the side walls, floor and ceiling of the heating chamber 12.

The electric heating means 14 may be divided into a series of control zones with local thermocouples. Multiple proportional integral derivative loops control the power to the individual zones to create an even temperature throughout the interior 16 of the heating chamber 12, and a controlled ramp rate during heating. Each thermocouple reading is continuously recorded in a database and related to the batch identification and time stamps. The thermal history of each batch load is therefore known and traceable.

The upper surface 49 of the base 46 of the at least one carrier 36 may comprise a reflective coating.

In the illustrated example, the heating chamber 12 is configured to receive a plurality of carriers 36 for locating asbestos or asbestos comprising structures in the interior 16 of the heating chamber 12. In the illustrated example, the heating chamber 12 is configured to receive three carriers 36. The base 46 of each of the plurality of carriers 36 is engageable with adjacent carriers 36 to provide an upper surface 49 which defines at least part of the floor 50 of the heating chamber 12 when the plurality of carriers 36 is received in the heating chamber 12. Accordingly, in a condition of the apparatus 10 when the plurality of carriers 36 is received in the heating chamber 12, the base 51 of the heating chamber 12 comprises the base 48 of each of the engaged plurality of carriers 36.

In the illustrated example, each respective carrier 36 comprises a male part 76 at one end, and a female part 78 at the other end. The male part 76 of one carrier 36 is engageable with a female part 78 of an adjacent carrier 36 to provide a substantially continuous flat upper surface 49 between adjacent engaged carriers 36.

The heating chamber 12 comprises a pair of doors 80 which comprise a mating part 82 engageable with the end most carrier 36 when received in the heating chamber 12. In the illustrated example, the mating part 82 is a female part engageable with a corresponding male part on the end most carrier 36. Furthermore, a mating part at the end of the inner most carrier 36 engages with a corresponding mating part (not illustrated) at the end of the heating chamber 12.

In some examples, the above described engagement between carrier(s) 36 and the heating chamber 12 defines a labyrinth heat seal. Furthermore, a gas seal is defined comprising flexible nickel reinforced silica textile.

Accordingly, in the illustrated example the heating chamber 12 is substantially sealed against air and vapour egress by way of the engagement between mating parts of the carrier(s) 36 and corresponding mating parts of the heating chamber 12. As a negative pressure is maintained in the heating chamber 12 air can only leak in (if at all) and vapours or dust cannot leak out.

In some examples of the disclosure, the apparatus 10 may be wirelessly connected to another device, for instance to alert an operative at the other device of a problem.

In the illustrated example, the heating chamber 12, afterburner 30, heat recovery means 34, primary filter 18, induced draft fan 20, secondary filter 32 and discharge stack 22 are connected by ducting 84 through which emissions may flow, which may be airtight ducting 84. Accordingly, the heating chamber 12 is fluidly connected with the discharge stack 22.

In the illustrated example, in use the induced draft fan 20 induces a negative pressure in the interior 16 of the heating chamber 12 to draw emissions from the heating chamber 12 through the afterburner 30, heat recovery means 34, and primary filter 18.

In some examples, the apparatus 10 is comprised in an enclosed space, with the exception of a part of the discharge stack 22 comprising the outlet 24 for venting emissions to atmosphere, which part extends out of the enclosed space. The enclosed space is defined by the interior of a building (not illustrated), wherein a ventilation system (not illustrated) is configured to maintain a negative pressure in the enclosed space. The outlet of the ventilation system is connected to a filter, for example a HEPA filter, such that any emissions from the enclosed space are filtered before venting to atmosphere. At least a part of the exterior of the building may comprise solar panels (not illustrated), wherein in use the electric heating means 14 for heating the interior 16 of the heating chamber 12 may be powered by electricity generated by the solar panels. Examples according to the present disclosure therefore have a positive environmental impact.

The ventilation system removes more exhaust air from the enclosed space than air is allowed into the enclosed space.

The figures also illustrate a method of thermally denaturing asbestos and/or thermally denaturing asbestos in asbestos comprising structures.

The method comprises loading asbestos or asbestos comprising structures into a heating chamber 12 comprising electric heating means 14. The method comprises heating the interior 16 of the heating chamber 12 with the electric heating means 14. The method comprises drawing emissions from the heating chamber 12 through a primary filter 18 using an induced draft fan 20. The method comprises venting emissions to external atmosphere through an outlet 24 of a discharge stack 22. The method comprises removing thermally denatured asbestos and/or structures comprising thermally denatured asbestos from the heating chamber 12.

In some examples, the method comprises heating the interior 16 of the heating chamber 12 to a first temperature of about 100 to 200° C., and subsequently heating the interior 16 of the heating chamber 12 to a second temperature of about 800 to 1200° C. In some examples, the second temperature is about 1200° C. The interior 16 of the heating chamber 12 may be maintained at the second temperature for about 4 to 7 hours.

Asbestos fibers, when heated to about 800° C. to 1200° C., lose their dangerous characteristics. The process consists of 3 stages: dehydrolysis (removal of free and adsorpbtion-bound water through evaporation); dehydroxilation (thermal chemical removal of the hydroxyl groups in the fibers); and conversion and decomposition (structural change of the crystalline structure of the material).

The amount of free and bound water in asbestos or asbestos comprising structures varies between 15 and 25%, depending on weather conditions. Asbestos comprising structures generally comprise only about 15% asbestos. The above process is based on evidence that asbestos fibers lose their crystalline structure and decompose into a safe pseudomorphic structure through removal of the free and adsorbed water (dehydrolysis), followed by removal of the crystalline bound water (dehydroxilation). A temperature level of about 1200° C. is more than sufficient to result in decomposition or denaturing of the different types of asbestos that occur in asbestos comprising structures. The standard treatment temperature is 1200° C. for safety reasons. The minimum temperature required is about 800° C. This means that even in case the type of asbestos in a structure is not known, the temperature is always sufficiently high to guarantee complete denaturing. Based on practical experience, a maximum residence time of up to 7 hours is required to result in complete denaturing. A minimum residence time of about 4 hours is required to result in complete denaturing.

There are two types of asbestos, namely: Chrysotile (white asbestos) and crocidolite (blue asbestos) that decompose into a different structure at a temperature of 400-600° C., thereby losing their hazardous characteristics. A third type of asbestos, Amosite (brown asbestos) decomposes at 700° C. Other types of asbestos do not show the typical fiber structure, they are mineral in character and are no danger to the environment and public health.

Chrysotile contains 11-13% water by weight while crocidolite and amosite contain only 1-2% water by weight. Chrysotile asbestos is most common and most flexible. About 85% of asbestos comprising structures contain chrysotile.

For chrysotile and crocidolite asbestos the minimum denaturing temperature is 700° C. Normally the following asbestos concentrations occur:

10-15% chrysotile asbestos 10-15% chrysotile asbestos and 0.1-5% crocidolite asbestos.

Occasionally, the following combinations of asbestos containing materials occur:

20-25% chrysotile asbestos ("asbestos marble")

15-30% chrysotile asbestos and 5-10% crocidolite asbestos (sewage piping).

Occasionally, amosite comprising structures are encountered. This material should be treated at a minimum temperature of 800° C.

As it is not always known whether an incoming structure comprises amosite asbestos, the minimum treatment temperature of the material must always be over 800° C.

In one example, the operation of the apparatus 10 comprises the following activities/phases. The carrier(s) 36 are loaded with asbestos or asbestos comprising structures. The carrier(s) 36 are moved into the heating chamber 12. The interior 16 of the heating chamber 12 is heated using the electric heating means 14 to about 100 C to 200° C. (pre-heating and drying phase). The heating chamber 12 is subsequently further heating to about 1200° C., and maintained at that temperature for up to about seven hours (thermal denaturing phase).

The method may comprise milling the denatured product. The denatured product may be milled to a selected size. Contaminants such as metal may be removed, wherein the product can then be transported in bags for further use. The milling process may be carried out in an enclosed environment and/or in a ventilated environment. Advantageously, examples of the disclosure provide a harmless aggregate product from asbestos. The aggregate can be used as a building material.

Any of the process steps noted above could be carried out manually or automatically.

Accordingly, in examples according to the present disclosure the asbestos is denatured by heating in the heating chamber 12 at temperatures and time periods specified above. In this thermal denaturing process the crystalline structure of the asbestos fibres is completely altered in such a way that the material loses its harmful properties. This is an irreversible process.

In an example of the disclosure wherein the structure comprises asbestos and cement the percentage of free and bound water varies between 15 and 25%, depending on the weather condition. It is important therefore that the method comprises heating the heating chamber 12 to a first temperature, wherein the first temperature is lower than the second temperature. At this lower first temperature the process of dehydrolysis can be affected. In practice, the heating chamber 12 would be heated gradually to the first temperature, for instance, by first heating the heating chamber 12 to 50° C., and then to 100° C., and then to the first temperature, wherein the first temperature may be from about a 100 C to 200° C. By slowly increasing the temperature of the heating chamber 12, possible explosions caused by rapidly evaporating water can be avoided. The heating chamber 12 is then heated to a second temperature, wherein the second temperature is about 800° C. to 1200° C.

There is thus described apparatus 10 and method with a number of advantages as detailed above.

Furthermore, electric heating of the heating chamber 12 offers the most accurate temperature control enabling the operator to be confident that all of the load (asbestos comprising structures) has been adequately treated. Electric Heating does not have the risk of explosion associated with combustion heated furnaces. Kiln explosions, whilst extremely infrequent, are not uncommon and it is considered too high a risk when the material to be treated is dangerous if made airborne (i.e. asbestos fibers). Electrical heating heats the load by radiation (i.e. low turbulence), and the absence of swirling combustion gases means that dust from the load cannot become entrained in the kiln gases. As there are no flue gases, the only gas to be collected, filtered and discharged comprises evolved water vapor, a small amount of combustion products from organic content in the waste, ventilation air and leakage air. As this is not combined with flue gas from combustion heating, the extraction and treatment plant can be smaller. Electric heating has a lower carbon intensity. Pollutants such as carbon monoxide or Nitrogen Oxides are not emitted.

In view of the controllability, safety, low turbulence (i.e. no turbulent flow), low gas volumes, lower carbon intensity and lower pollution of the apparatus 10 and method, examples of the disclosure are suitable for treating very low-level radioactive waste (VLLW) and low-level radioactive waste (LLW). In examples of the disclosure carbon-14 or hydrogen-3 (tritium) will be released at an allowable steady rate as the bound water is heated. This is the safest option.

Thermally denaturing asbestos is an alternative to such materials going to landfill. Furthermore, the denatured material is harmless, and can be recycled.

Although embodiments of the present invention have been described in the preceding paragraphs with reference to various examples, it should be appreciated that modifications to the examples given can be made without departing from the scope of the invention as claimed. For example, a duty/standby fan pair may be provided to ensure a negative pressure in the interior 16 of the heating chamber 12 at all times. The pressure may be controlled by a loop modulating fan speed to target a given pressure differential between the interior of the building (in which the apparatus 10 is located) and the interior 16 of the heating chamber 12.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that comprise some but not all of the instances in the class. It is therefore implicitly disclosed that a features described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus, the apparatus comprising:

a heating chamber, the heating chamber comprising electric heating means for heating the interior of the heating chamber to denature asbestos or asbestos in asbestos comprising structures located in the interior of the heating chamber;

a primary filter downstream of the heating chamber;

an induced draft fan downstream of the primary filter, wherein the apparatus is configured such that in use the induced draft fan draws emissions from the heating chamber through the primary filter; and a discharge stack downstream of the primary filter, the discharge stack comprising an outlet for venting emissions to external atmosphere;

wherein:

the heating chamber is configured to receive at least one carrier for locating asbestos and/or asbestos comprising structures in the interior of the heating chamber, the at least one carrier comprises a frame extending from a base, wherein asbestos and/or asbestos comprising structures are locatable on or in the frame, and an upper surface of the base of the at least one carrier defines at least part of a floor of the heating chamber when the at least one carrier is received in the heating chamber.

2. An apparatus according to claim 1, wherein the heating chamber comprises electric heating means on each respective interior surface.

3. An apparatus according to claim 1, wherein the apparatus comprises an afterburner downstream of the heating chamber and upstream of the primary filter, the afterburner being configured to heat emission from the heating chamber.

4. An apparatus according to claim 1, wherein the apparatus comprises a secondary filter downstream of the induced draft fan.

5. An apparatus according to claim 4, wherein the secondary filter is a high-efficiency particulate absorber (HEPA) filter.

6. An apparatus according to claim 3, wherein the apparatus comprises a heat recovery means downstream of the heating chamber.

7. An apparatus according to claim 6, wherein the heat recovery means is downstream of the afterburner and upstream of the primary filter.

8. An apparatus according to claim 6, wherein the heat recovery means is a heat recovery boiler.

9. An apparatus according to claim 1, wherein the apparatus comprises a track, a part of the track underlying the heating chamber, wherein the at least one carrier is moveable along the track to be received in the heating chamber.

10. An apparatus according to claim 9, wherein the apparatus comprises a cooling station for locating denatured asbestos or denatured asbestos comprising structures.

11. An apparatus according to claim 10, wherein the track extends from the heating chamber to the cooling station, a part of the track underlying the cooling station, wherein the at least one carrier is moveable along the track to be received in the cooling station.

12. An apparatus according to claim 1, wherein the heating chamber and a base of the at least one carrier comprises corresponding mating parts, wherein the mating parts are engageable when the at least one carrier is received in the heating chamber.

13. An apparatus according to claim 12, wherein the mating part of the heating chamber extends at least along interior side portions of the heating chamber, and the mating part of the base of the at least one carrier extends at least along the length of each side of the base.

14. An apparatus according to claim 13, wherein an upper surface of each respective interior side portion defines a part of the floor of the heating chamber, wherein the remainder of the floor is defined by the upper surface of the base of the at least one carrier when the at least one carrier is received in the heating chamber.

15. An apparatus according to claim 12, wherein the mating parts are slidingly engageable.

16. An apparatus according to claim 1, wherein the base of the at least one carrier comprises electric heating means for heating the interior of the heating chamber when the at least one carrier is received in the heating chamber.

17. An apparatus according to claim 1, wherein the heating chamber is configured to receive a plurality of carriers for locating asbestos or asbestos comprising structures in the interior of the heating chamber, wherein a base of each of the plurality of carriers is engageable with adjacent carriers to provide an upper surface which defines at least part of the floor of the heating chamber when the plurality of carriers is received in the heating chamber.

18. An apparatus according to claim 1, wherein the apparatus is comprised in an enclosed space with the exception of a part of the discharge stack comprising the outlet for venting emissions to atmosphere, which part extends out of the enclosed space.

19. An apparatus according to claim 18, wherein the enclosed space is defined by the interior of a building, wherein a ventilation system is configured to maintain a negative pressure in the enclosed space.

20. An apparatus according to claim 19, wherein at least a part of the exterior of the building comprises solar panels, wherein in use the electric heating means for heating the interior of the heating chamber is powered by electricity generated by the solar panels.

21. An apparatus comprising:

a heating chamber, the heating chamber comprising electric heating means for heating the interior of the heating chamber to denature asbestos or asbestos in asbestos comprising structures located in the interior of the heating chamber;

a primary filter downstream of the heating chamber;

an induced draft fan downstream of the primary filter, wherein the apparatus is configured such that in use the induced draft fan draws emissions from the heating chamber through the primary filter; and a discharge stack downstream of the primary filter, the discharge stack comprising an outlet for venting emissions to external atmosphere;

wherein:

the heating chamber is configured to receive at least one carrier for locating asbestos and/or asbestos comprising structures in the interior of the heating chamber, and the heating chamber and a base of the at least one carrier comprises corresponding mating parts, wherein the mating parts are engageable when the at least one carrier is received in the heating chamber.

22. An apparatus according to claim 21, wherein the mating part of the heating chamber extends at least along interior side portions of the heating chamber, and the mating part of the base of the at least one carrier extends at least along the length of each side of the base.

23. An apparatus according to claim 22, wherein an upper surface of each respective interior side portion defines a part of the floor of the heating chamber, wherein the remainder of the floor is defined by the upper surface of the base of the at least one carrier when the at least one carrier is received in the heating chamber.

24. An apparatus according to claim 21, wherein the mating parts are slidingly engageable.

25. An apparatus comprising:

a heating chamber, the heating chamber comprising electric heating means for heating the interior of the heating chamber to denature asbestos or asbestos in asbestos comprising structures located in the interior of the heating chamber;

a primary filter downstream of the heating chamber;

an induced draft fan downstream of the primary filter, wherein the apparatus is configured such that in use the induced draft fan draws emissions from the heating chamber through the primary filter; and a discharge stack downstream of the primary filter, the discharge stack comprising an outlet for venting emissions to external atmosphere;

wherein:

the heating chamber is configured to receive at least one carrier for locating asbestos and/or asbestos comprising structures in the interior of the heating chamber, the at least one carrier comprises a frame extending from a base, wherein asbestos and/or asbestos comprising structures are locatable on or in the frame, and the base of the at least one carrier comprises electric heating means for heating the interior of the heating chamber when the at least one carrier is received in the heating chamber.

26. An apparatus comprising:

a heating chamber, the heating chamber comprising electric heating means for heating the interior of the heating chamber to denature asbestos or asbestos in asbestos comprising structures located in the interior of the heating chamber;

a primary filter downstream of the heating chamber;

an induced draft fan downstream of the primary filter, wherein the apparatus is configured such that in use the induced draft fan draws emissions from the heating chamber through the primary filter; and a discharge stack downstream of the primary filter, the discharge stack comprising an outlet for venting emissions to external atmosphere;

wherein the heating chamber is configured to receive a plurality of carriers for locating asbestos or asbestos comprising structures in the interior of the heating chamber, wherein a base of each of the plurality of carriers is engageable with adjacent carriers to provide an upper surface which defines at least part of a floor of the heating chamber when the plurality of carriers is received in the heating chamber.

* * * * *